United States Patent [19]

Overton et al.

[11] Patent Number: 5,380,430
[45] Date of Patent: Jan. 10, 1995

[54] MAGNETIZING APPARATUS FOR TREATMENT OF FLUIDS

[76] Inventors: James M. Overton, 1127 Nickel La., Yuba City, Calif. 95991; Stephen R. Wurzburger, Box C, Goodyear's Bar, Calif. 95944

[21] Appl. No.: 167,621

[22] Filed: Dec. 13, 1993

Related U.S. Application Data

[63] Continuation of Ser. No. 918,955, Jul. 24, 1992, abandoned.

[51] Int. Cl.⁶ .................................................. C02F 1/48
[52] U.S. Cl. ..................................... 210/222; 335/304
[58] Field of Search ............. 210/222, 223, 695; 335/302, 304, 306

[56] References Cited

U.S. PATENT DOCUMENTS

| | | | |
|---|---|---|---|
| 1,447,053 | 2/1927 | Trimm | 70/18 |
| 2,832,932 | 4/1958 | Baermann | 324/152 |
| 2,895,092 | 7/1959 | Cluwen | 335/304 |
| 3,609,611 | 9/1971 | Parnell | 335/284 |
| 3,907,072 | 9/1975 | Shafer | 188/32 |
| 4,201,140 | 5/1980 | Robinson | 110/218 |
| 4,265,746 | 5/1981 | Zimmerman, Sr. et al. | 210/222 |
| 4,367,143 | 1/1983 | Carpenter | 210/222 |
| 4,605,498 | 8/1986 | Kulish | 210/222 |
| 4,711,271 | 12/1987 | Weisenbarger et al. | 137/827 |
| 4,833,442 | 3/1989 | Von Heck | 340/568 |
| 4,892,655 | 1/1990 | Makovec | 210/695 |
| 4,933,151 | 6/1990 | Song | 210/222 |
| 4,935,133 | 6/1990 | Hirama | 210/223 |
| 4,946,590 | 8/1990 | Hertzog | 210/222 |
| 4,956,084 | 9/1990 | Stevens | 210/222 |
| 5,033,444 | 7/1991 | Kaufman et al. | 123/527 |
| 5,092,283 | 3/1992 | Holt | 123/41 |
| 5,100,642 | 3/1992 | Baycura | 423/648 |
| 5,125,647 | 6/1992 | Smith | 482/8 |
| 5,148,982 | 9/1992 | Ekhof | 239/1 |

Primary Examiner—Matthew O. Savage
Attorney, Agent, or Firm—Robert Samuel Smith

[57] ABSTRACT

A set of magnetic assemblies for treating fluids including water and liquid and gaseous fuels wherein each assembly includes a construction of permanent magnets and pole pieces arranged to optimize a "figure of merit" number defined as the integral of the absolute value of magnetic field intensity over region occupied by the fluid. In one embodiment, each assembly includes an elongated magnet with permeable pole pieces at each end bent back toward each other to form a gap equal to one half the length of the magnet. In another arrangement, each assembly includes a permanent magnet having a pole piece leading around toward the flux surface at the other end of the magnet, adjacent to the fluid carrier. Dimensions of the area of the pole end surface are selected based on the permeability of the pole piece, magnetization intensity of the permanent magnet material and pipe diameter to maximize the Figure of merit. Figure of merit is maximized by placing an odd number of assemblies around the conduit. Fluid flowing in long lengths of pipe is treated by arranging assemblies on the pipe spaced from one another by a distance equal to the flow velocity times the lifetime of the treatment effect.

1 Claim, 3 Drawing Sheets

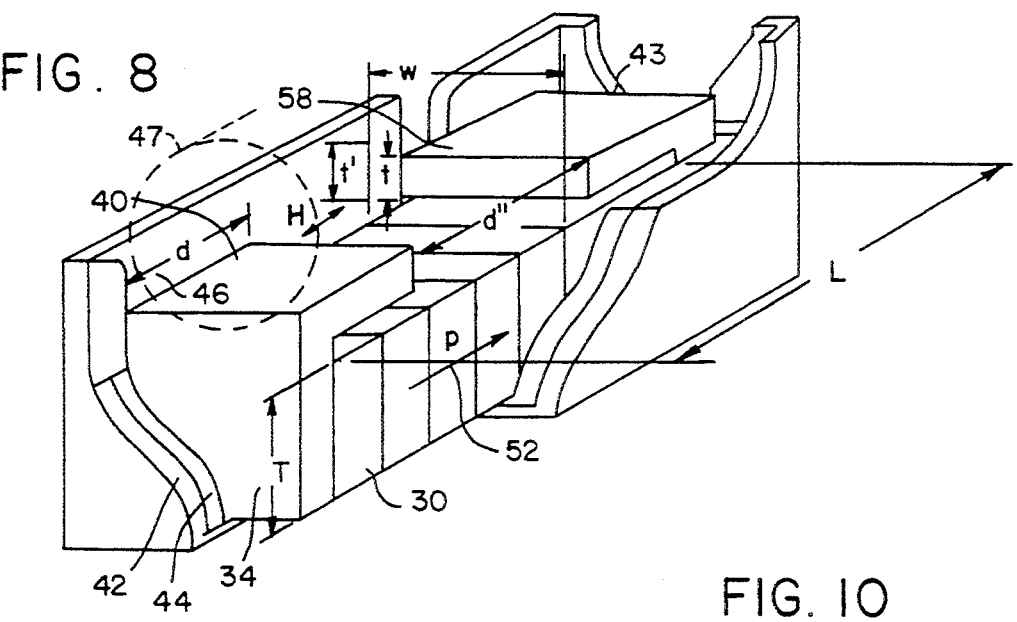
FIG. 8
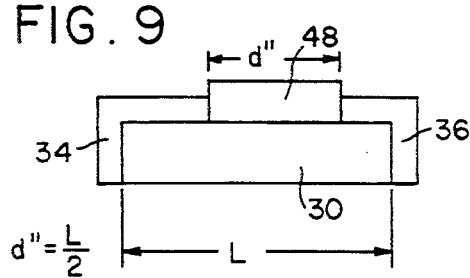
FIG. 9
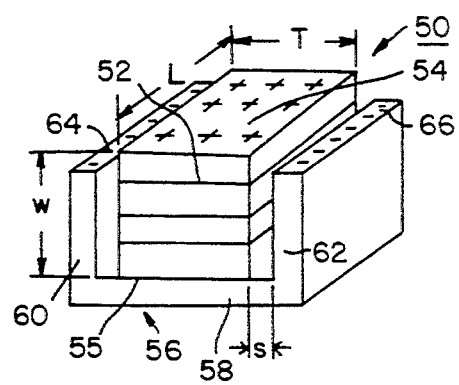
FIG. 10
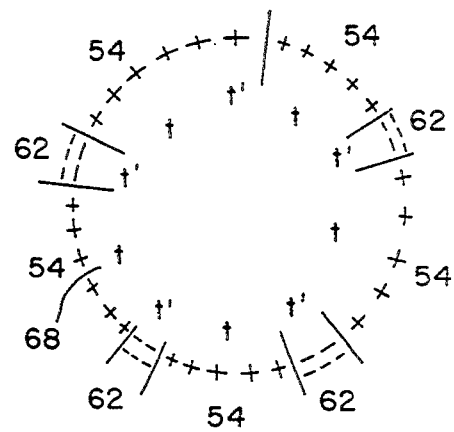
FIG. 11
FIG. 12

MAGNETIZING APPARATUS FOR TREATMENT OF FLUIDS

This is a continuation of copending application(s) Ser. No. 07/918,955 filed on Jul. 24, 1992, now abandoned.

BACKGROUND

1. Field of the Invention

This invention relates to treatment of fluids and particularly to the use of a magnetic field for the treatment of fluids.

2. Prior Art

Many publications concerning magnetic phenomena have appended covering a broad range of subjects related to such diverse topics as theories and experiments on the magnetic properties of materials, applications involving these materials, nuclear magnetic resonance, etc. However, relatively little formal theory has been developed to explain reaction of fluids to magnetic fields disclosed in the patent literature. The devices and techniques disclosed in the patent literature have been developed on an empirical basis.

U.S. Pat. No. 4,201,140 to Robinson is for a chamber that houses a magnetic array through which fluid is circulated. U.S. Pat. No. 4,933,151 is for an array of disk (circular) magnets having a central hole through which fluid passes in the axial direction of the magnets. Neither arrangement can be adapted to the outside surface of an existing career. ("Carrier" in the context of this specification means conduit or tank.)

U.S. Pat. No. 4,605,498 to Kulish discloses magnetic treatment of liquids by concentrating "primarily south pole magnetic fields on the liquids to provide descaling and deliming properties thereto". The apparatus generally comprises a cylindrical structure of molded plastic surrounding a pipe through which a liquid is passed. The casing contains plural magnets arranged around the periphery of the pipe in such a manner that their north poles are directed radially outward from the central axis of the pipe and their south poles are directed radially inward toward the axis of the pipe in order to concentrate the south pole magnetic fields more strongly on the fluid.

The general treatment of magnetostatics is presented in numerous texts to which the reader is referred. (See, e.g., Principles of Electricity and Magnetism by G. P. Hamwell, McGraw Hill, 1938) However, the highlights of the theory which bear on this specification are presented as follows:

A magnetic circuit is analogous to an electric circuit and since there may be more familiarity with an electric circuit, it is useful to present the analogy. In an electric circuit, the applied voltage, V, generates an electric current, I, in series connected resistances, R1, R2, --- Rn, according to the relation:

$$V = I(R1 + R2 + \cdots Rn)$$

Each resistance, Rn, of a region of the circuit having a length, L, cross sectional area, A, and resistivity, r, is given by:

$$Rn = rL/A$$

Analagously (see FIG. 7), in a magnetic circuit comprising a permanent magnet 14 generating a magnetic flux 16 around a continuous path consisting of regions 18, 20, of various lengths, cross sectional areas and magnetic permeabilities:

magnetizing force, pLA, is analogous to voltage, V, (where p is the polarization, L is the length of the magnetized body, and A is the cross sectional area of the magnetized body);

total flux, $\phi$ is analogous to electric current, I;

reluctance, P, is analogous to resistance, R. Thus, the reluctance, P, of each region is:

$$P''' = L'''/A'''u'''$$

$u'''$ is the magnetic permeability of the region, $A'''$ is the area, $L'''$ is the length.

Therefore, $$pLA = \phi(P' + P'' + \cdots Pn)$$

But, $$\phi = B'A' = u'H'A'$$

where B' is flux density in the region of area A', H' is the magnetic field in the region, u' is the permeability of the region.

Therefore, the magnetic field, H', in region A' is $$H' = pLA/A'[P1 + P2 + \cdots Pn]u'$$

Another approach to calculating field intensity is to treat a permanently magnetized medium as mathematically equivalent to replacing the body by a surface charge. For example, FIG. 2 shows an ellipsoid 22 that is uniformly magnetized as indicated by the (+ −) dipoles. FIG. 3 shows the mathematical equivalent in which the body dipoles shown in FIG. 2 have been hypothetically replaced by equivalent surface charges 24 in FIG. 3. This substitution reduces the problem of calculating the field intensity generated by the polarized ellipsoid of FIG. 2 to finding the potential function, V, of the surface charge of FIG. 3 and equating the magnetic field to the gradient of V. This approach is explained in a number of texts particularly as applied to situations where conditions are constant in one direction (the "z" coordinate) thereby reducing the problem to finding a potential function dependent on only two coordinates, r, and $\theta$. (See FIG. 4) For example, $V(r,\theta)$ for a line charge q parallel to the z axis located at $r',\theta'$, $$V(r, \theta) = 2q (r/r') [\cos n\theta' \cos n\theta + \sin n\theta' \sin n \theta]/n \qquad 1./$$

(W. R. Smythe, Static and Dynamic Electricity, Mcgraw Hill, 1939)

The effect of positioning a pole piece on the charged surface is to transfer the charge from the surface of the magnetized body to the fartherest surface of the pole piece. This is illustrated in FIG. 5 showing a uniformly magnetized horseshoe magnet with surface charges + and − compared to FIG. 6 showing the horseshoe magnet 26 with pole pieces 28.

The point of the foregoing remarks in relation to this specification is to emphasize that a magnetic field imposed within a pipe by a magnetic array will be determined not only by any north or south poles placed in the immediate vicinity of the pipe wall, but also by the shapes and properties of the parts that make up the entire magnetic circuit.

THE INVENTION

Objects

It is an object of this invention to provide an apparatus comprising a magnetic array for treatment of fluids.

It is another object to use the device to descale pipe or other devices associated with water particularly hot water, such as boilers.

It is another object that the apparatus and method of the invention be noninvasive of the pipe.

It is another object to generate a combination of intense magnetic field throughout the largest volume per unit length of pipe in order to prevent pipe scale.

It is another object to reduce the hardness of water.

SUMMARY

This invention is directed toward a novel magnetic structure including a construction of pole pieces in operable combination with permanent magnets and conduit of fluid whose effectiveness in descaling pipe and demineralizing water in a conduit has been optimized by arranging and dimensioning permanent magnets and polepieces to optimize a FIGURE OF MERIT. The FIGURE OF MERIT is chosen on the intuitive basis that the object is to generate a sufficiently intense magnetic field to treat the fluid within a region of interest.

Three situations may be considered to illustrate the approach.

CASE 1. The object is to descale a steel pipe (magnetically permeable) so that the region of interest lies adjacent to the inside surface of the pipe.

For this case, the magnetizing force of the magnetic assembly must be greater than a "critical" field determined by the permeability of the pipe. The first Figure of merit is defined as the integral (sum) of the the difference between the applied field and the critical field taken over the region along the surface of the pipe.

For case 1, the structure comprises a substantially rectangular array of permanent magnets, each end of the array having an angular pole piece with an end bent toward the other to provide a gap length defining the treatment area that is about one half the length of the permanent magnet array. The array is housed in an elongated aluminum box having a substantially square cross section in which one elongated side is open to provide access to the gap region. The magnetic array and pole pieces are spaced from the aluminum box by insulating material. The array is held together by encapsulation with epoxy. The surface of epoxy at the open top of the box is contoured to conform to the pipe to be descaled so that, when the array is held with the open top snugly against the pipe, the axis of the pipe is parallel to the long dimension of the box.

Case 2. has the object of treating a body of fluid such as modifying the conductivity of water where such modification is an aid to subsequent deionizing of water. The pipe diameter is large relative to the magnetic assembly of this invention and the velocity is slow enough to enable the fluid to remain in the influence of the field. The requirement of the magnetic assembly is to project the magnetic lines of flux into the body of the water. For this case, the second FIGURE OF MERIT is defined as the integral of the square of the intensity of the magnetic field taken over the entire cross sectional area of the pipe multiplied by the length of the magnetic assembly along the as is of the pipe.

A magnetic assembly for this situation, which is an embodiment of this invention, is a rectangular magnet having a length, width and thickness and magnetized in the direction of its width. The two opposing sides of the magnet bounded by the length and thickness will be referred to as the "flux" surfaces. A pole piece, having the general shape of a channel with two side panels joined by a joining panel, straddles the magnet with the side panels adjacent to respective sides of the magnet and the joining panel abutting a flux surface. In position for treating fluid, the flux surface opposite the pole piece is placed in proximity to the pipe, with the length of the magnet parallel to the pipe axis. With this arrangement, flux in the permanent magnet leads out of the flux surface of the magnet, enters the conduit and goes through the water, exits the conduit and goes through the pole piece to the other flux surface of the permanent magnet. The flux lines are perpendicular to the centerline of the pipe. Novelty of the invention resides in selecting the thickness of the pole piece as small as possible compared to the thickness of the permanent magnet without saturating the pole piece and in configuring the flux surfaces of the permanent magnet and pole piece to be adjacent to the conduit wall.

A set of magnetic assemblies (either the first or second construction) constitutes a number of these magnetic assemblies placed side by side around the periphery of the pipe, the number in a set depending on the diameter of the pipe. Further novelty in the invention resides in placing an odd number of these assemblies around the pipe. The calculated second FIGURE OF MERIT defined for this case is proportional to $1/m$ where $m$ is the number of magnetic assemblies in the set when $m$ is odd. However, the Figure of merit is zero if $m$ is even. This conclusion, reached by mathematical analysis, is supported by experimental results as will be discussed subsequently.

CASE 3. The object is treat a fluid such as modifying the conductivity of water in a system which requires imposing a magnetic field across an entire area of a conduit. In this case, the diameter of the pipe is small relative to the magnetic assembly of this invention and the flow rate through tile pipe is relatively first so that tile volume of magnetic treatment must encompass a considerable length of pipe in order that the fluid remain in the influence of the field for a sufficient period of time for reaction with the field to take place. The magnetic assembly used in CASE 3 is the same as the magnetic assembly used in CASE 2 except that, due to practical limitations in accommodating the size of the assembly to the small pipe diameter, the magnetic assembly is oriented so that the substantial component of flux is parallel to the axis of the pipe.

In CASES 2 and 3, the effectiveness of projecting the flux lines into the interior of the pipe is enhanced by additional pole pieces mounted on the flux surface of the permanent magnet array facing the pipe wall and the pipe is preferably non magnetically permeable.

The effect on the fluid has a finite lifetime depending on conditions of the fluid such as temperature, fluid composition, etc. In order to treat a long length of pipe, it is another embodiment of this invention to place a number of sets along the entire length of the pipe, spaced from one another. The distance between sets depends on the velocity of flow of water in the pipe. Our experiments indicate that the modifying effect on the water at room temperature lasts for about four minutes. Therefore, the magnet sets are placed a distance apart equal to the velocity of flow, in feet per minute times four.

DRAWINGS

FIG. 8 shows a first embodiment of a magnetic assembly of the invention.

FIG. 9 shows the magnetic circuit equivalent of the magnetic assembly of FIG. 8.

FIG. 10 shows a second embodiment of a magnetic assembly of the invention.

FIG. 11 shows an odd number of the assemblies of FIG. 10 arranged around a conduit.

FIG. 12 shows the magnetic pole distribution equivalent of FIG. 11.

DESCRIPTION OF THE BEST MODE

Figure 1:
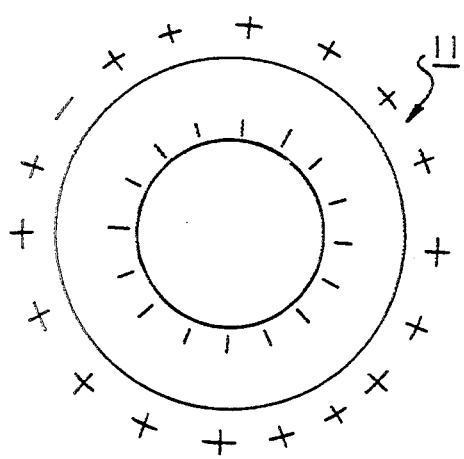
FIG. 1 is prior art showing a long cylindrical magnet magnetized radially.
Figure 2:
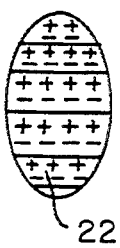
FIG. 2 is prior art showing an ellipsoid uniformly magnetized.
Figure 3:
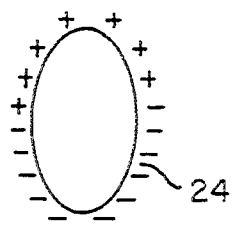
FIG. 3 is prior art showing surface charge on a magnetized ellipsoid.
Figure 4:
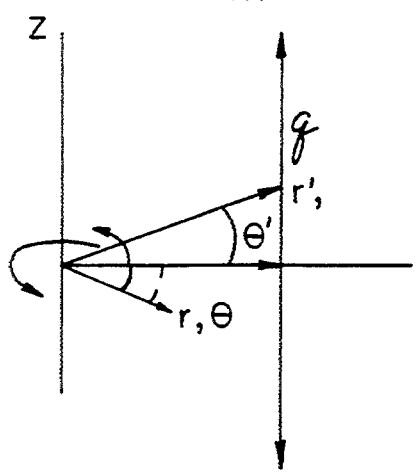
FIG. 4 is prior art illustrating polar coordinates and a line charge, q.
Figure 5:
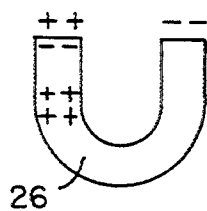
FIG. 5 is prior art illustrating a horse shoe magnet.
Figure 6:
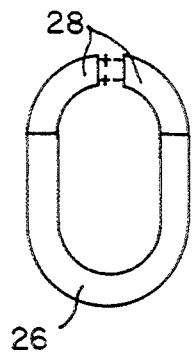
FIG. 6 is prior art showing the magnet of FIG. 5 with polepieces.
Figure 7:
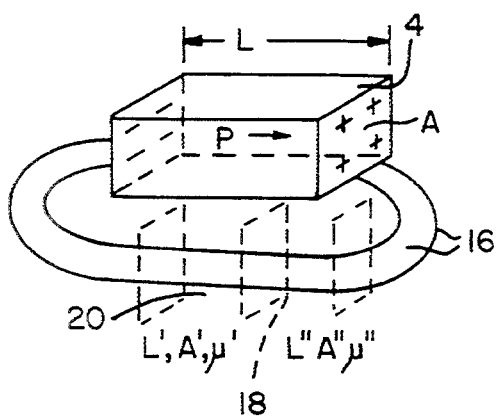
FIG. 7 is prior art illustrating a magnetic circuit with reluctances.

The following paragraphs describe several variations and modifications of our invention including what we presently believe to be the best mode for carrying out the invention.

Turning now to a discussion of the drawings, FIG. 8 shows one magnetic assembly of this invention for application to case 1 discussed in the SUMMARY. The magnetic assembly includes a stack of magnets 30. (Alternatively, a one piece magnet could be used in place of the stack however the stack with a plurality of small magnets is generally more available in the market.) The stack 30 is magnetized in the direction indicated by the arrow 32. Each stack end of stack 30 is provided with a pole piece 34 or 36 respectively made of magnetically soft permeable metal arms '38 and 40 pointing toward each other.

The entire stack is positioned in an elongated aluminum box 42, spaced from the inside surfaces of the box by insulation sheets 44. The box 42 and sheets 44 are partially cutaway in FIG. 8. The entire assembly is encapsulated in epoxy 43 shown in phantom in FIG. 8. The exposed surface 46 of the epoxy is contoured to have a cylindrical shape with diameter equal to the diameter of the pipe 47, shown in phantom.

A feature of this invention is selection of the dimensions of the assembly to maximize the combination of the field intensity between the pole pieces and the volume between the pole pieces over which the field extends. The selection of dimensions has been found on an empirical basis and substantiated mathematically. It has been found empirically that the optimum length, d, of the gap is equal to about one half the length, L, of the magnet stack 30.

Although we do not wish to be bound by theory, it will now be shown that this selection of the gap length, d, is supported by optimizing first a "Figure of merit" for the assembly which is defined as th by the fluid adjacent to the inside surface of the conduit i.e., $E = \int |H| \, dv$.

Referring to FIG. 8, the dimensions will be represented as length of the stack: - - - L
width of the stack: - - - W
Thickness of the stack: - - - T
Thickness of the pole piece: - - - t
magnetic field in the gap - - - H
critical magnetic field having an intensity less than which, the reaction will not occur - - - Hc
Thickness of the volume between the pole pieces over which the field has a value H>Hc that is sufficiently intense to "treat" water - - - t'
length of the pole piece: - - - d
width of the pole piece: - - - w
magnetic flux density in the stack: - - - p
permeability of the pole pieces, - - - u
length of the gap, - - - d' = L − d
magnetic field in the gap, - - - H'

In order to calculate an approximate value of the field, H', one may note that the magnetic assembly of FIG. 8 includes a continuous circuit of reluctances arranged as shown in FIG. 9. which includes the reluctance of the magnet 30, the reluctance of the polepieces 34 and 36 and the reluctance between the pole pieces 48. The reluctance between the pole pieces is the combination of reluctance Pa due to the air space between the gap shunted by reluctance Ps of the pipe extended between the pole pieces. According to classical theory, the total magnetizing force imposed by the permanent magnet on the magnetic circuit is pLwT. Then the field in the gap is $$H' = pLTw / (t' + t''u'' + L + \{[t' + t''u'']/ut - 1\}d)$$

which has the form:

H' = D/(F − d) where D anti F are constants.

The volume, v, of the gap is d"wt'

When the first Figure of merit, E, defined for the purpose of evaluating the effectiveness of a magnetic assembly (FIG. 8) in treating the length of pipe wall between the pole pieces with sufficiently intense field (H' − Hc) is defined as E = (H' − Hc)d'wt'. (field H' multiplied by volume d'wt')

then it can be shown that there is a value of d' = L − d determined by setting the derivative dE/d (d) = 0 for which E is maximum. This value of d' (gap length) has been determined experimentally for the magnetic assembly configuration shown in FIG. 8 and has been shown to be about d' = L/2.

FIG. 10. is a perspective view of a magnet structure 50 which is an embodiment of this invention that has Ken found empirically and substantiated theoretically to be effective for treating fluids for purposes such as modifying the conductivity of water. The structure 50 comprises a substantially rectangular stack of permanent magnets having a length L, a width, W, and a thickness, T. The magnet 52 is magnetized in the direction of the width dimension thereby creating two opposing flux surfaces, a "plus charged" surface 54 and the surface 55 opposite surface 54. The pole piece 56 is a channel swaddling the permanent magnet with a central panel 58 joining two channel legs 60 and 62 and abutting a first flux surface 64 so that the channel legs 60 and 62 extend along the sides of the magnet 52 towed the second flux surface 54. Therefore, flux lines emanating from the second flux surface are captured and intensified by the proximity of the free ends 64 and 66 of the pole piece legs 60 and 62.

The method of use of the magnetic assemblies 52 as shown in FIG. 11 for case 2, where the diameter of the pipe is relatively large compared to the dimensions of the magnetic assembly, is to distribute a number of them around the periphery of the pipe 68. Five assemblies 50 are shown in FIG. 11. The effectiveness of the treatment (e.g., rate of reduction of hardness of water,) increases as the intensity of magnetic field in the region 70 generated by the assemblies 50 is increased.

The constuction parameters, (size of magnets, number of assemblies, construction of the pole pieces, etc.) were selected on an empirical basis. Although we do not wish to be bound by theory, the following discussion and calculations support these empirical results.

The problem is to select the construction parameters of the magnetic assemblies and the number placed around the pipe that will optimize a second "Figure of merit" which is an indication of the efficiency with which the magnetic structure treats the water. The second "Figure of merit" is defined in the context of this specification as $$E = \int_A |H| dA$$

A is the cross sectional area inside the pipe and $|H|$ is the intensity of the magnetic field inside the pipe generated by the magnetic assemblies 50.

This calculation will be made by first arriving at a potential function V and computing the magnetic field H as the gradient of V. To begin, some reasonable approximations will be made that will simplify the calculations.

The first approximation is that the poles generating the lines of flux are line charges parallel to the axis of the pipe so that the problem can be treated in two dimensions. This approximation leads to a view of the cross section of the pipe as shown in FIG. 12 where the flux surface of the permanent magnet material 54 and the surface of the pole pieces 62 are indicated arranged around the pipe 68.

The second assumption is that the permeability of the pole pieces 62 and 64 is large so that the pole pieces capture all of the flux lines at the end of the pole pieces.

The third assumption is that E will be greatest when the thickness of the pole pieces t' is much smaller than the thickness t of the pole pieces. This approximation is made on the basis that the number, N, of flux lines entering the pipe will be increased as the number of charges lining the periphery of the pipe is increased, i.e., $t \gg t'$. These assumptions lead to a model for the charge distribution shown in FIG. 12 which shows positive charges distributed uniformly around the circular section which represent the flux surface of the magnets, and negative charges located at discrete locations around the circle. Therefore V inside the circle will be a superposition of the potential V+ from the positive charges and V− from the negative charges. But V+ will be approximated constant everywhere in the circle so the field H+ due to V+ is zero as shown in connection with the discussion of FIG. 1. This means we need only calculate the field H− due to the potential V− generated by the charges induced on the pole piece faces.

Figure 13:
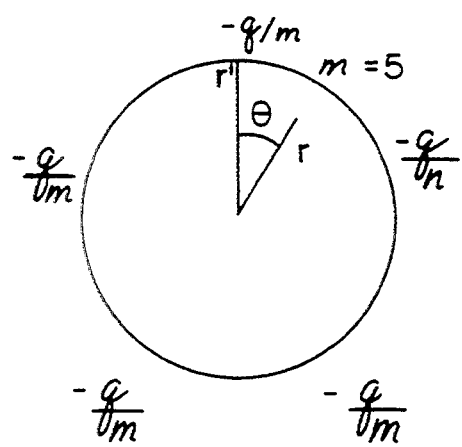
FIG. 13 shows the mathematical equivalent of FIG. 12.

As shown in FIG. 13, the cross sectional area within the pipe is defined as being a plane with coordinates r and $\theta$. From equation 1./(see BACKGROUND) a discrete single line charge located at r' and $\theta' = 0$ generates a potential $$V = 2q \, [(r/r') \exp n] \cos n\theta$$

Then m discrete line charges distributed around the circle will generate a potential $$V- = 2q[(r/r') \exp n] \cos n(\theta + 2\Pi a/m)$$

It may be noted that E for the magnetic configuration in FIG. 1 is zero since the classical theory shows that V is uniform everywhere in region 10.

The polar orthogonal components of the magnetic field, H, are $$H_r = dV/dr \quad H\theta = dV/r \, d\theta$$

The second Figure of merit, E, is defined to be $r'2 \pi$ $$E = \int_o^{r'} \int_o^{2\pi} r dr \, d\Theta |H(r\Theta)| = \int_o^{r'} \int_o^{2\pi} r dr \, d\Omega (H r^2 + H o^2)$$

where $|H(r,\theta)|$ is the magnitude of the vector magnetic field.

The integrations are carried out over the area of the pipe having a diameter r', and are performed in accordance with the following identities:

$$\int_o^\infty [(\cos nx)/x] dx = \pi/2$$

$$\int_o^\pi (\cos ax)(\cos bx) dx = 0$$

$$\int_o^\pi (\sin ax)(\sin bx) dx = 0$$

$$\int_o^\pi (\sin ax)^2 dx = \int_o^\pi (\cos ax)^2 dx = \pi/2$$

$$\int_o^{2\pi} (\sin ax)(\cos ax) dx = 0$$

$$\int_o^{2\frac{\pi}{2}} (\sin ax)(\cos bx) dx =$$

0 if $(a - b)$ is even, $2a/(a - b)$, if $a - b$ is odd $$\sum_{n=1}^m [\cos(2\pi an/m)][\cos(2\pi bn/m)] = 0 \text{ if } m \text{ is even}$$

$$= m \text{ if } m \text{ is odd}$$

Making the indicated substitutions and integrating over the area of the circle gives:

$$E = (1/m) \sum_{n=0}^{\infty} (1/2n)[\cos(2\pi an/m)][\cos(2\pi bn/m)]$$
$$= C(1/m) \text{ if } m \text{ is odd} \quad (C \text{ is a constant})$$
$$= 0 \text{ if } m \text{ is even}.$$

Using the second Figure of merit as a guide, one would therefore predict that the most efficient arrangement would be to have uniform magnetic charge distributed all the way around the ring with a single small pole piece having great enough permeability to capture all the flux. This corresponds to the case where m=1. This arrangement is costly to manufacture and would require a very small pole piece and a very high permeability. Therefore, in practice, it is generally more convenient to use a number of magnetic assemblies of this invention attached to the pipe as shown in FIG. 11.

In the above analysis, each leg of the magnetized pole pieces was assumed to be equivalent to a line charge. This is a good approximation since t<<t' however a similar analysis can be performed assuming t' is extended along the circle and the results of this analysis would be essentially the same as the case for assuming t' very small, therefore this case will not be presented in the interest of brevity. Although the E number defined above can only be an approximate guide, the above value of E predicts that an odd number of assemblies arranged around the pipe is much more efficient for treating fluid than an even number of assemblies. This was, indeed, found to be the case as discovered by the inventors BEFORE the above mathematical analysis was undertaken and, indeed, this discovery was the event that motivated the mathematical analysis presented above.

As in case 2, described above, where the diameter of the pipe is large compared to the dimensions of the magnet assemblies and the rate of flow through the pipe is small, the most effective orientation of the magnets of FIG. 10 is with the flux perpendicular to the centerline of the pipe. In case 3, where the diameter of the pipe is small compared to the dimensions of the magnet assembly and the rate of flow through the pipe is large, then the field must be imposed over a greater length of pipe and the most effective orientation of the magnetic assembly is with the flux lines substantially parallel to the axis of the pipe.

A number of factors dictated by practicality must enter into the design and construction of the magnetic assembly that are not addressed by the above mathematical analysis.

One factor is that a space S (see FIG. 10) must be provided between the side of the pole piece and the side of the magnet so as not to shunt out flux lines along the sides of the permanent magnet. Observations of flux distribution taken performed with flux powder indicates that the flux is concentrated on the long side close to the top corner of the pole piece however the symmetry of the field is preserved so that the mathematics sented above is nevertheless a good approximation to the arrangements shown in FIG. 10-16.

Another consideration is that the permeability of the pole piece dictates the minimum thickness of the pole piece that can be selected. If the thickness of the pole piece is too small, the end of the pole piece will be saturated by the available flux lines so that any further reduction of the thickness of the pole piece would increase reluctance and thereby diminish the efficiency of the magnetic assembly.

Figure 17:
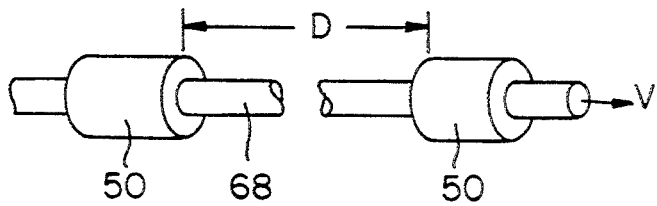
FIG. 17 shows magnetic assemblies distributed at intervals along a pipe.

Our experiments show that the treatment effect on water (which is the ability of the magnetically treated water to descale pipe) lasts for about four minutes for typical conditions although this time would be expected to vary with different conditions of the water such as temperature, composition of mineral content, etc. Therefore, as shown in FIG. 17, in order to treat fluid flowing in long lengths of pipe in which fluid is flowing at a known velocity, v, sets of the magnetic assembly are arranged at interval distances along the pipe equal to D=vt where t is the lifetime of the effect and D is the distance the water can travel in the pipe from a magnetic array 50 on the pipe and still be substantially capable of descaling the pipe.

When the magnet assemblies are used to descale pipe or boilers, etc., the scale (primarily calcium carbonate) comes off the pipe and collects in an appropriate site down stream as a sludge which is removed from the system.

As an illustration of the operation of this invention, thirteen sets of magnet assemblies were arranged along a half mile length of pipe. The sets were spaced eighty feet apart. The pipe initially was coated with scale one half inch thick. After thirty days, the inside of the pipe was bare and many buckets of sludge were collected down stream.

In the foregoing paragraphs, embodiments of the invention were described which meet the objects of the invention. The crux of the invention is a construction of a magnetic assembly including permanent magnets and polepieces arranged to maximize a "Figure of merit" to maximize treatment of fluids. The magnetic assembly used to treat water leads to the precipitation and removal of compounds at a convenient location that would otherwise deposit as scale in critical areas of the water system. The permanent magnet performs one function in the magnetic circuit and the pole pieces perform another function. The permanent magnet material must provide the largest flux density but it must also have a large coercive force which is the property of the magnet material that maintains the magnetic strength of the magnet over a long period of time. Therefore, the materials selected for this function include ceramic magnets, ferrites, rare earth transition metal alloys and particularly nitrogenated or carburized rare earth transition metal alloys. The pole pieces must have very high permeability in order that they can concentrate and direct the flux. The materials with this greatest capability are soft ferromagnetic alloys. An example of which are iron nickel alloys such as permalloy that have a very low coercive force.

The scope of the invention includes not only the construction of the individual assemblies but also the arrangement of a number of assemblies into sets and the distribution of the sets through out the water system in accordance with what has been discovered to be the time dependent properties of the treated fluid.

Other modifications and variations of the magnetic assemblies are suggested by inspection of the drawings and studying the specification which are within the scope of the invention.

For example, additional pole pieces of material having a large permeability may be secured to the flux surface of the permanent magnet in order to ensure that the flux will emanate from the end surface of the permanent magnet rather than leak off the sides.

Figure 14:
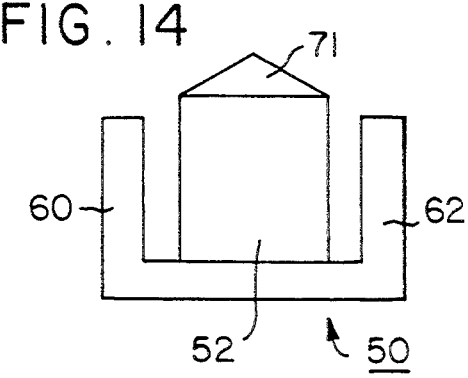
FIG. 14 shows the magnet assembly of FIG. 10 with a peaked pole piece.

FIG. 14 shows a magnet assembly 50 as in FIG. 10 in which the flux surface has a flux shaping pole piece 71 that is triangular in cross section with a peak that contacts the external surface of the conduit. This modification is useful on small pipe, e.g., an inch in diameter.

Figure 15:
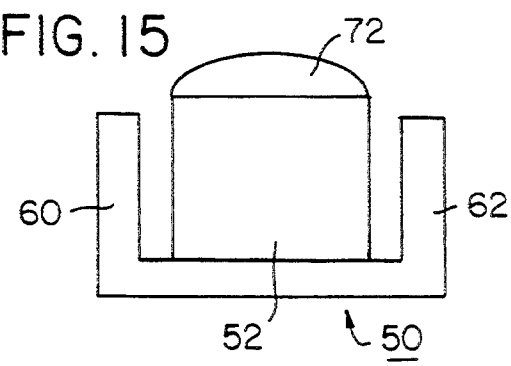
FIG. 15 shows the magnet assembly of FIG. 10 with rounded pole piece.

FIG. 15 shows a magnet assembly 50 in which the flux surface of the permanent magnet is provided with a rounded flux shaping pole piece 72 having a semiconductor cross section wherein the rounded surface contacts the external surface of the conduit. This construction is effective for use on large pipe.

Figure 16:
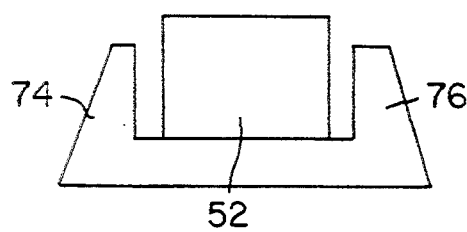
FIG. 16 shows the magnet assembly of FIG. 10 with trapezoidal pole pieces.

FIG. 16 shows the cross section of a magnetic assembly in which the legs 74 and 76 of the pole pieces have a triangular cross section which further reduces the reluctance of the flux path.

The magnetic assembly may be used in a variety of applications for treating fluids. One application is the modification of the conductivity of water and another application is in the descaling of pipe.

Figure 18:
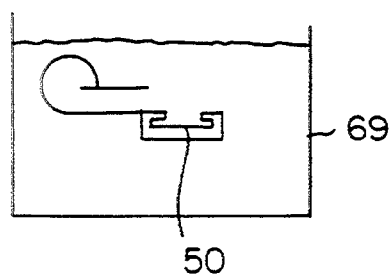
FIG. 18 shows a magnetic assembly immersed in a tank.

It may be used in other situations in which the carrier is a tank such as a boiler in which case the magnetic assemblies are placed in the tank and fluid circulated therethrough by a pump. In this application, the magnetic assembly is constructed in accordance with the method of this assembly which is to maximize the Figure of merit. Such a system is shown in FIG. 18 where a magnetic assembly 50 such as shown in FIG. 8 or 10 is shown immersed in a tank 69 of fluid and circulated by pump 67.

In view of the modifications and variations that may be introduced in carrying out the principles of my invention, we wish to define the scope of our invention by the appended claims.

We claim:

1. An apparatus for treating water which comprises:

a non magnetic conduit having an external surface and one end with an opening and another end with an opening such that water is enabled to flow into one opening and out of the other opening, said conduit having a longitudinal axis;

a permanent magnet having a first flux surface and a second flux surface for generating flux lines extending substantially from said first flux surface to said second flux surface, said magnet being rectangular cross section with said flux surfaces arranged on major surfaces of said magnet;

a magnetically permeable pole piece having opposed first and second pole end surfaces, said first pole end surface being substantially planar and in mating contact with the first flux surface of said magnet, said second pole end surface being in contact with said external surface of said conduit, said pole piece having a cross sectional shape selected from the group consisting of a semicircle or triangle;

a magnetically permeable channel having two side panels and a joining panel, each side panel having a pair of parallel panel edges, said joining panel having a pair of parallel panel edges and an inner surface, wherein one said edge of one of said side panels is joined to one said edge of said joining panel and one said edge of the other of said side panels is joined to the other said edge of said joining panel;

said permeable channel being mounted such that said permeable channel straddles said permanent magnet with the inner surface of said joining panel abutting said second flux surface of said magnet and with the side panels extending toward said conduit and being substantially parallel to sides of said permanent magnet, wherein side panels are spaced from an adjacent one of the sides of said permanent magnet.

* * * * *